W. B. HARRIS.
MACHINE FOR CUTTING WINDOW FRAME POCKETS.
APPLICATION FILED DEC. 14, 1908.
997,059.
Patented July 4, 1911.
3 SHEETS—SHEET 1.
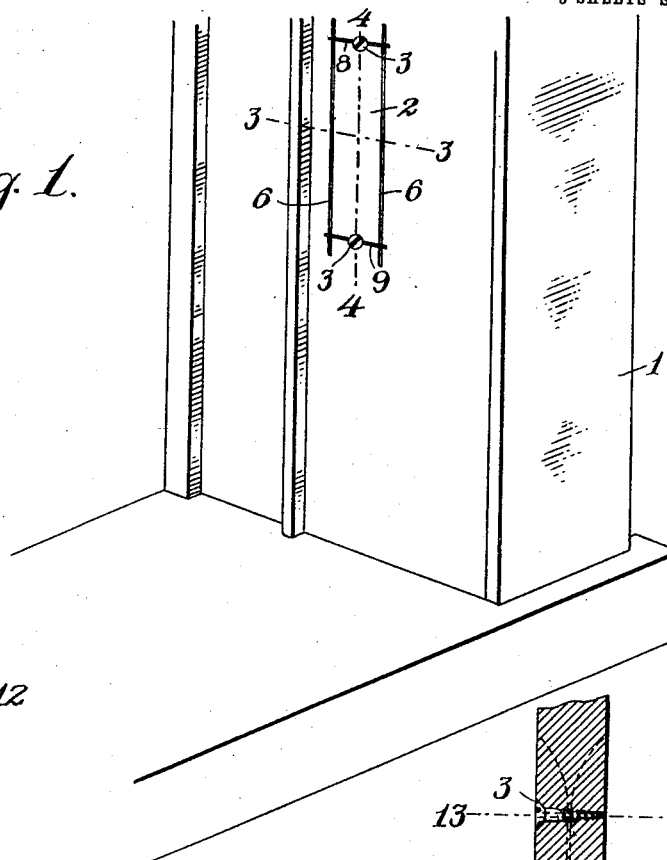
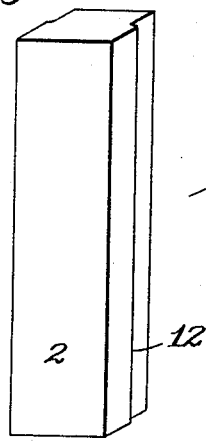
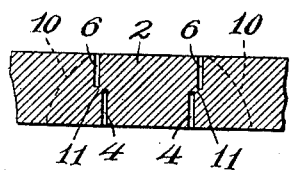
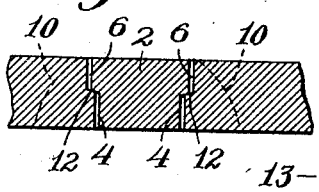
Witnesses
Roy D. Tolman
Penelope Cumberbach
Inventor
Warren B. Harris
By Rufus B. Fowle
Attorney
COLUMBIA PLANOGRAPH CO., WASHINGTON, D. C.

W. B. HARRIS.
MACHINE FOR CUTTING WINDOW FRAME POCKETS.
APPLICATION FILED DEC. 14, 1908.

997,059.

Patented July 4, 1911.

3 SHEETS—SHEET 2.

Witnesses
R. D. Tolman.
Penelope Comberbach.

Inventor,
Warren B. Harris.
By Rufus B. Fowler
Attorney

W. B. HARRIS.
MACHINE FOR CUTTING WINDOW FRAME POCKETS.
APPLICATION FILED DEC. 14, 1908.

997,059.

Patented July 4, 1911.
3 SHEETS—SHEET 3.

Witnesses.
R. D. Tolman
Penelope Cumberbach

Inventor
Warren B. Harris.
By Rufus B. Fowler
Attorney

UNITED STATES PATENT OFFICE.

WARREN B. HARRIS, OF MILLBURY, MASSACHUSETTS.

MACHINE FOR CUTTING WINDOW-FRAME POCKETS.

997,059.  Specification of Letters Patent.  Patented July 4, 1911.

Application filed December 14, 1908. Serial No. 467,532.

*To all whom it may concern:*

Be it known that I, WARREN B. HARRIS, a citizen of the United States, residing at Millbury, in the county of Worcester and Commonwealth of Massachusetts, have invented a new and useful Improvement in Machines for Cutting Window - Frame Pockets, of which the following is a specification accompanied by drawings forming a part of the same, in which—

Figure 5:
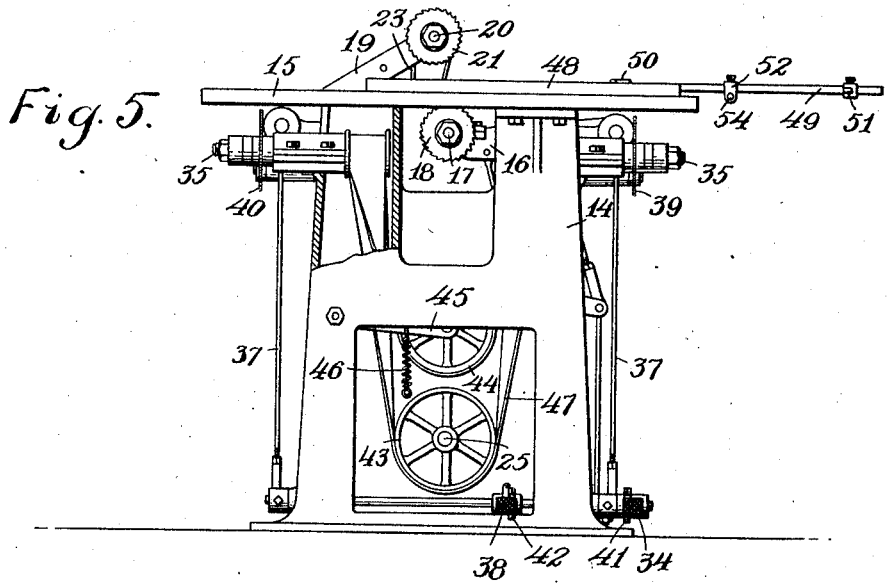
Figure 6:
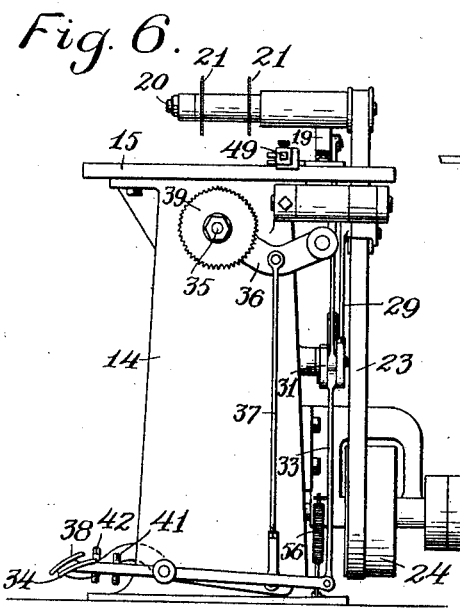
Figure 7:
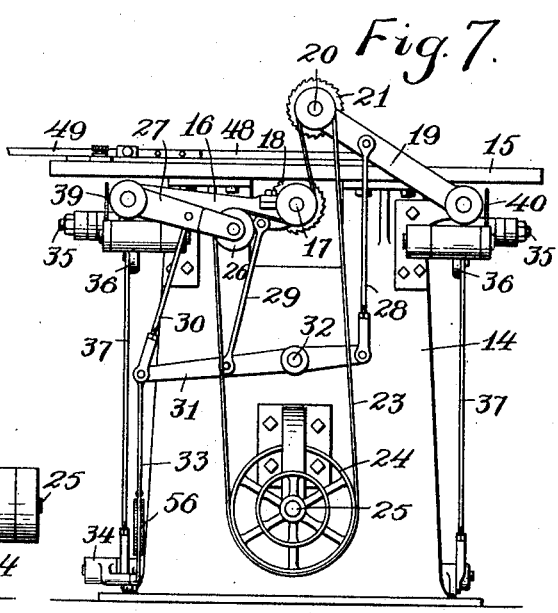
Figure 8:
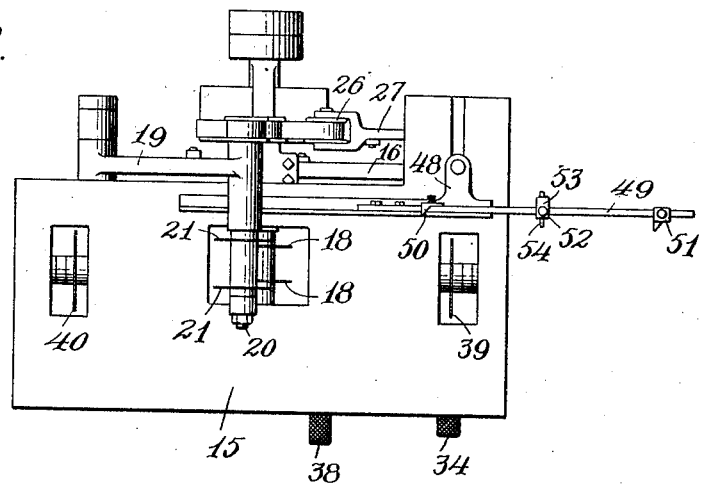
Figure 9:
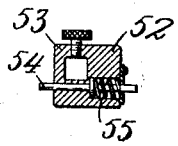

Figure 1 is a perspective view of a portion of a window frame, showing one of my improved pockets. Figs. 2 and 3 are transverse sectional views through the removable piece or cover of the pocket, shown on the plane of the broken line 3—3, Fig. 1, Fig. 2 showing the frame after sawing and before the removal of the cover, and Fig. 3 showing the same view after the cover has been removed or broken away from the window frame. Fig. 4 is a longitudinal view with the cover fastened in place, shown in section on the plane of the broken line 4—4, Fig. 1. Fig. 5 is a side view of a sawing machine for cutting the window frames to form a cover for the pocket. Fig. 6 is an end view of the same. Fig. 7 shows the side of the machine opposite to that shown in Fig. 5. Fig. 8 is a plan view of the machine. Fig. 9 is a central sectional view of one of the gages shown on a larger scale, and Fig. 10 is a detached perspective view of the cover or closing piece for the pocket.

Similar reference letters and figures refer to similar parts in the different views.

My present invention relates to improvements in a machine for cutting pockets in the stile of a window frame to allow the sash weights to be put in and removed, and it consists in the matters hereinafter described and set forth in the accompanying claims.

Referring to the accompanying drawings 1 denotes a portion of a window stile having a pocket for the reception of the sash weights, which is normally closed by a cover 2 held in place by screws 3, 3. By my improved method of forming the pocket the opening in the window stile is completed by two operations, and the piece removed is made to serve as a cover. In forming the opening in the window stile I cut two slits 4, 4, in the back side of the window stile, extending substantially half way through the window stile and of sufficient length so the parallel line of the saw kerf, as indicated by the broken line 5, Fig. 4, will be the desired length of the pocket. I also form two slits 6, 6, in the face of the window stile by means of circular saws extending approximately half way through the window stile, and having the parallel line of the saw kerf, as indicated by the broken line 7, Fig. 4, the desired length of the pocket. After the longitudinal saw kerfs 4 and 6 have been formed two transverse saw kerfs 8 and 9 are formed on the rear side of the window stile by means of circular saws forming circular saw kerfs, as indicated by the broken lines 10, Figs. 2 and 3, the transverse saw kerfs extending entirely through the window stile between the longitudinal slits 6, 6, thereby entirely severing the ends of the cover 2 from the window stile. The cover 2 is then slightly held by the fibers of the wood at 11, 11, at the narrow strip between the inner edges of the saw kerfs 4 and 6, enabling the piece 2 to be detached by the blow of a hammer applied to its back. Screw holes are then formed at the ends of the cover to receive the wood screws 3, 3, which hold the cover in place when the pocket is closed, the narrow space between the inner edges of the saw kerfs 4 and 6 forming shoulders as indicated at 12, 12, Fig. 3, upon which the opposite edges of the cover rest.

I am able to form each pair of saw kerfs 4, 4, and 6, 6, at a single operation by moving the window stile over the top of a saw table, through which a pair of circular saws project a sufficient distance to form the saw kerfs, whereby the saw kerfs 4, 4, are formed while the saw kerfs 6, 6, may be cut at the same operation by depressing a pair of saws a sufficient distance to give the proper depth to the saw kerfs 6, 6, the length of the pocket being determined by the movement of the window stile past the saws. The saw kerfs by which the ends of the cover are separated, as indicated by the broken lines 10, 10, Figs. 2 and 3, and located on the planes of the broken lines 13, 13, 13, 13, Fig. 4, sever the end of the cover at a single operation by means of a pair of saws projecting through the saw table as far as the thickness of the window stile, while the latter is held in a stationary position. The machine by which these operations are performed is shown in Figs. 5 to 9, inclusive, and consists of a frame 14 upon which is mounted a saw table 15, and on which are supported a pair of swinging arms 16, having journal bearings for an arbor 17, carrying a pair of circular saws 18 the proper distance apart to form the saw kerfs 4. Pivoted upon the framework is a swinging arm 19 in the free ends of which is journaled a saw arbor 20 carrying a pair of saws 21 the proper distance apart to form the saw kerfs 6, 6. The arbors 17 and 20 are driven through a common belt connection 23 with a pulley 24 on a driving shaft 25. A tightening pulley 26 is carried in the free end of a pivoted lever 27. Links 28, 29 and 30 connect the levers 19, 16 and 27 respectively, with a rocking lever 31 pivoted to the framework at 32, and connected by a link 33 with a foot treadle 34. The depression of the foot treadle imparts a rocking motion to the lever 31 which raises the saws 18 and depresses the saws 21, sufficiently to form the proper depth of the saw kerfs 4 and 6, while at the same time the tightening pulley 26 is raised in order to hold the belt 23 taut. An arbor 35 is journaled in the free ends of pivoted arms 36 which are raised by links 37 connected with a foot treadle 38. The arbor 35 is placed at right angles to the arbors 17 and 20 and it carries a pair of saws 39 and 40, the proper distance apart to form the saw kerfs at the end of the pocket cover 2, said saws being capable of being raised by the foot treadle 38 through the saw table a distance sufficient to sever the end of the cover 2. Adjustable stops consisting of adjusting screws 41 and 42 limit the angular movement of the treadles 34 and 38. The arbor 35 is driven from the main driving shaft 25 by means of a belt connection with a pulley 43 which is wrapped around a tightening pulley 44 carried in the free end of a lever 45, pivoted to the framework of the machine and being drawn down by the tension of a spiral spring 46 in order to maintain the driving belt 47 taut. Upon the saw table is mounted a side gage 48 to which is adjustably attached a bar 49 carrying gages 50, 51, and 52 adjustably held upon the bar 49. The gage 52 consists of a block 53 adjustable on the bar 49 and provided with a slidable pin 54 which is held projecting from the block 53 by means of a spiral spring 55, as shown in Fig. 9.

The operation of the machine is as follows:—The window stile in which the pocket is to be formed is placed upon the saw table 15, with one edge against the side gage 48 and with one end against the stop gage 51. Placing the window stile in this position the slidable pin 54 is pushed into the block 53 against the tension of the spiral spring 55. The window stile is then in position for the beginning of the longitudinal cuts or saw kerfs 4 and 6. By depressing the treadle 34 the pivoted lever 31 is rocked, thereby raising the saws 18 through the saw table to form the saw kerfs 4, and depressing the saws 21 to form the saw kerfs 6. The window stile is then pushed forward by the operator between the saws 18 and 21 until the rear end of the window stile moves into registration with the gage 50, thereby determining the length of the saw kerfs 4 and 6. The treadle 34 is then released and the spring 56 connecting the link 33 with the framework of the machine reverses the motion of the rocking lever 31, causing the saws 18 to be depressed and the saws 21 to be raised into their normal position, as shown in Figs. 1 and 3. The window stile when released from the saws 18 and 21 is then moved lengthwise on the table 15 until the rear end of the stile strikes the slidable gage pin 54. In this position of the window stile the saws 39 and 40 are raised by the treadle 38, causing two transverse saw kerfs 8 and 9 to be made through the window stile. The saws 39 and 40 are raised far enough to sever the ends of the cover 2 from the window stile when the operation is completed, and the window stile with the cover 2 attached thereto by the fibers of wood at the narrow strip 11 is ready to be built into the window frame. When the frame is to be placed in the building the covers 2 are knocked out of the window stile breaking the fibers at the narrow strips 11 and forming shoulders 12, 12, Fig. 3. The cover is then retained in place by wood screws 3.

I claim,

1. In a machine of the character described, the combination with a work supporting table, of a pair of saws mounted on a swinging arm above said table, a second pair of saws mounted on a swinging arm below said table, with the planes of opposite saws slightly offset, a pivoted lever below said table, means for rocking said lever, with one end of said lever connected with one of said swinging arms and with the other end connected with the other of said swinging arms, and means for operating said saws.

2. In a machine of the character described, the combination with a work supporting table, of a pair of rotating saws mounted on a swinging arm above said table, a second pair of rotating saws mounted on a swinging arm below said table, with the planes of opposite saws slightly offset, means for simultaneously swinging the upper arm downward and the lower arm upward and for reversing the movement, and means for rotating said saws.

3. In a machine of the character described, the combination with a work supporting table, of a pair of rotating saws mounted below said table, a pair of rotating saws mounted above said table, means for swinging said saws into or out of engagement with the work as desired, a driving shaft provided with a pulley, a common belt connection between said rotating saws and said driving pulley, and means for tightening said belt connection arranged to operate when said saws are swung into engagement.

4. In a machine of the character described, the combination with a work supporting table, of a pair of rotating saws mounted below said table, a pair of rotating saws mounted above said table, a driving shaft provided with a pulley, a common belt connection between said rotating saws and said driving pulley, and means operating simultaneously for swinging said saws into or out of engagement with the work as desired and for tightening said belt connection.

5. In a machine of the character described, the combination with a work supporting table, of a pair of rotating saws mounted on a swinging arm below said table, a second pair of rotating saws mounted on a swinging arm above said table, a driving shaft provided with a pulley, a common belt connection between said saws and said driving pulley, a tightening pulley for said belt connection carried on a swinging arm, a pivoted lever below said table, means for rocking said lever, and connecting means between said lever and each of said swinging arms.

6. In a machine of the character described, the combination with a work supporting table, of a pair of rotating saws mounted below said table, a pair of rotating saws mounted above said table, means for swinging said saws into or out of engagement with the work as desired, a third pair of rotating saws with their axis transverse to the axes of said first two pairs of saws, said third pair of saws mounted upon swinging arms, means for swinging said arms to bring said saws also into or out of engagement with the work as desired, and means for operating said saws.

7. In a machine of the character described, the combination with a work supporting table, of a pair of rotating saws mounted below said table, a pair of rotating saws mounted above said table, means for swinging said saws into or out of engagement with the work as desired, a third pair of rotating saws with their axis transverse to the axes of said first two pairs of saws, said third pair of saws mounted upon swinging arms, means for swinging said arms to bring said saws into or out of engagement with the work as desired, means for operating said saws, and means mounted upon said supporting table for determining the position of the work with reference to said first two pairs of saws, said means also arranged to determine the position of the work with reference to said third pair of saws.

8. In a machine of the character described, the combination with a work supporting table, of a pair of saws mounted on a swinging arm above said table, a second pair of saws mounted on a swinging arm below said table, a pivoted lever below said table, means for rocking said lever, with one end of said lever connected with one of said swinging arms and with the other end connected with the other of said swinging arms, and means for operating said saws.

WARREN B. HARRIS.

Witnesses:
PENELOPE COMBERBACH,
RUFUS B. FOWLER.

---

Copies of this patent may be obtained for five cents each, by addressing the "Commissioner of Patents, Washington, D. C."